United States Patent Office 3,278,839
Patented Oct. 11, 1966

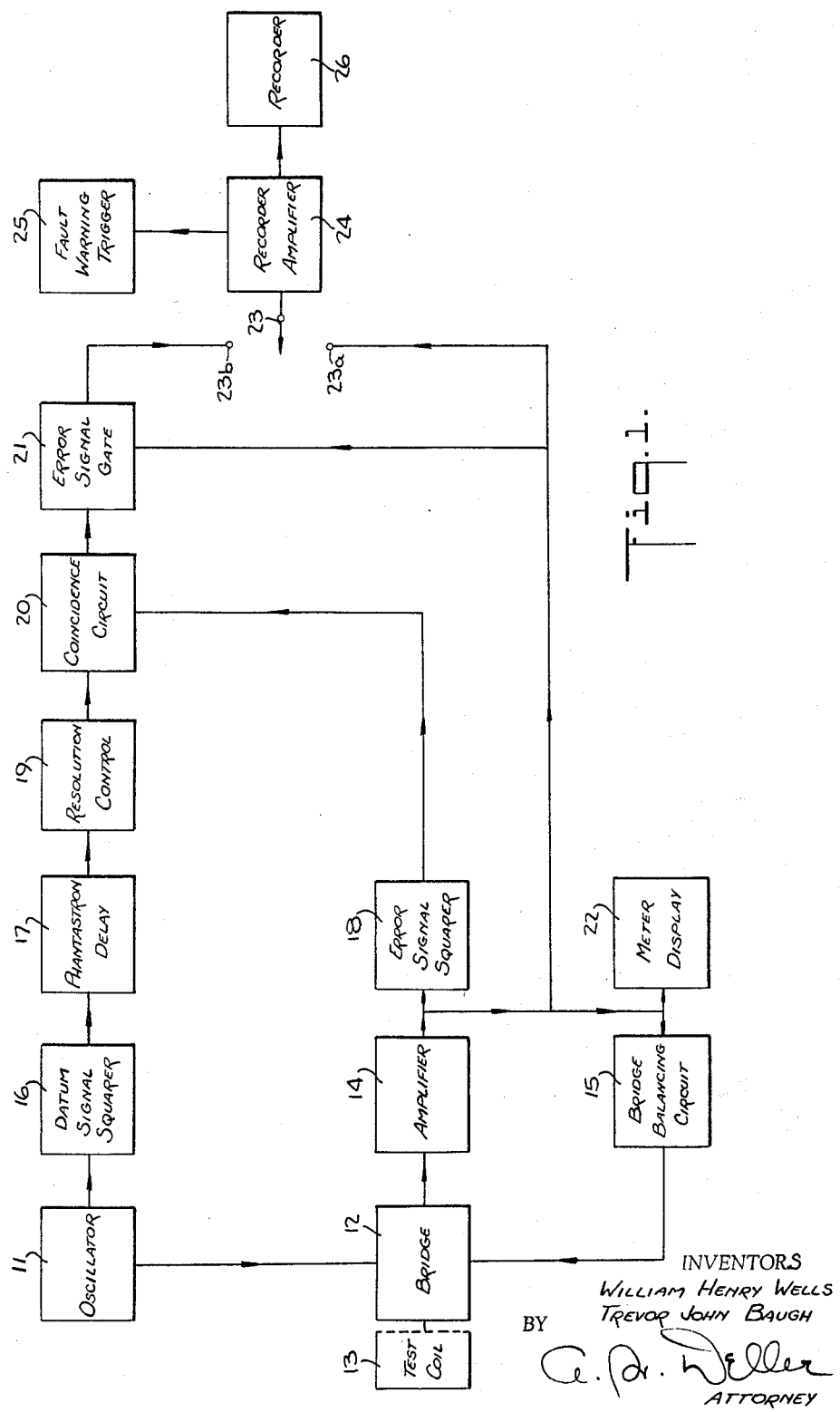

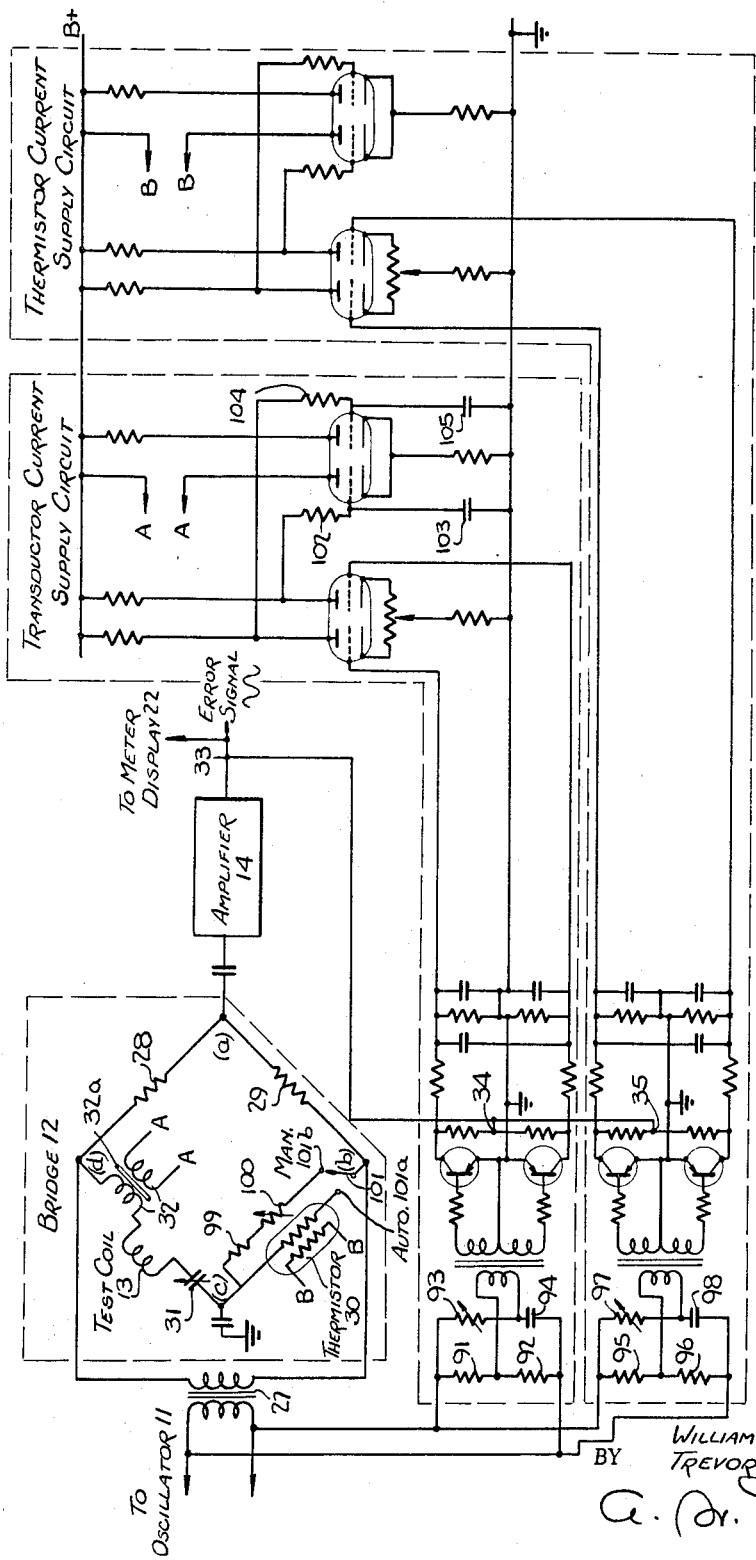

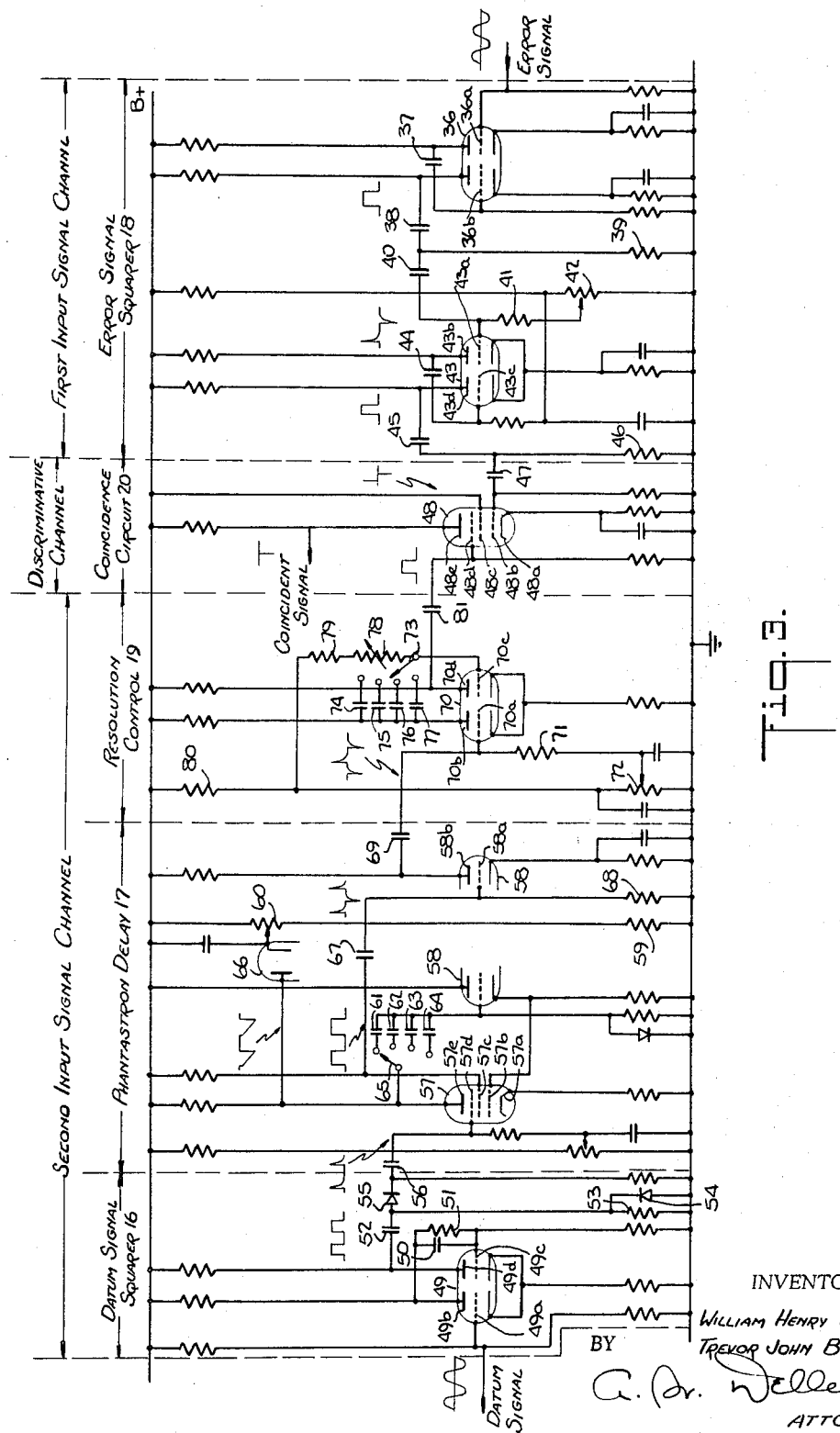

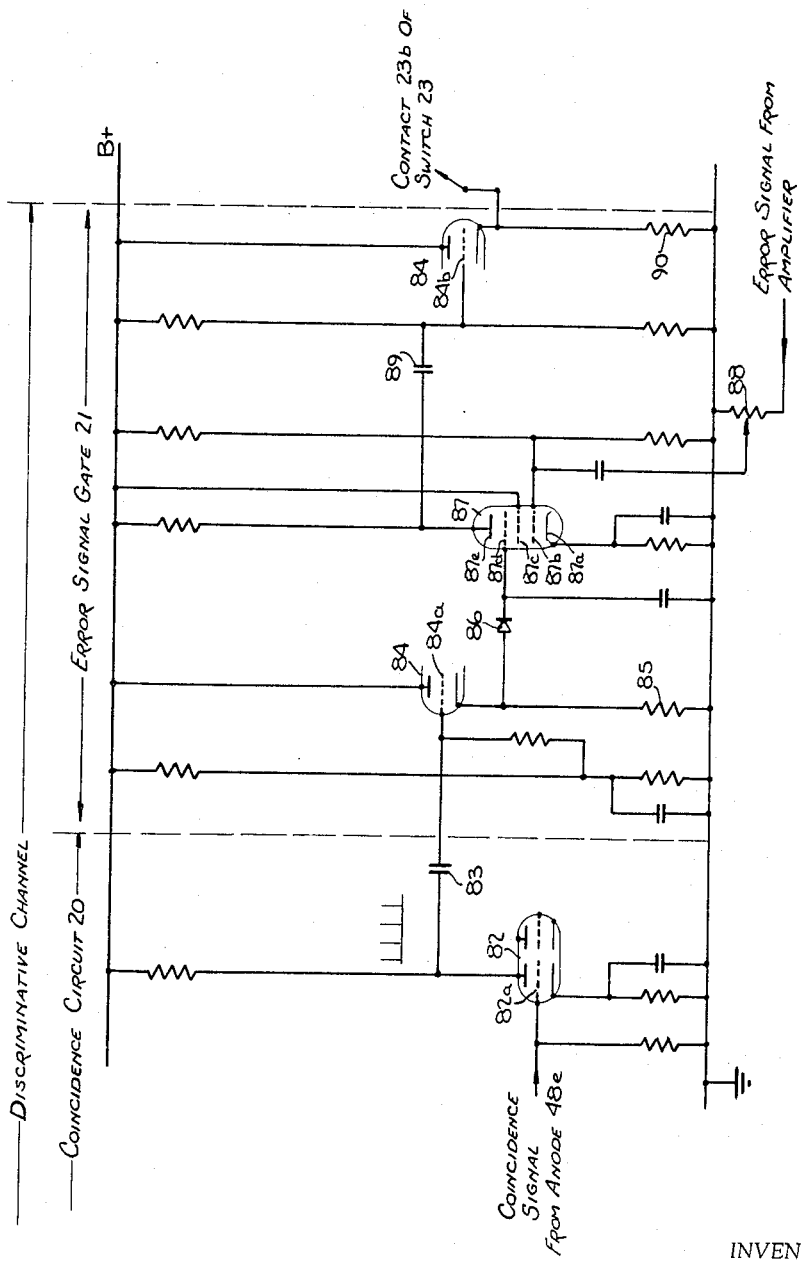

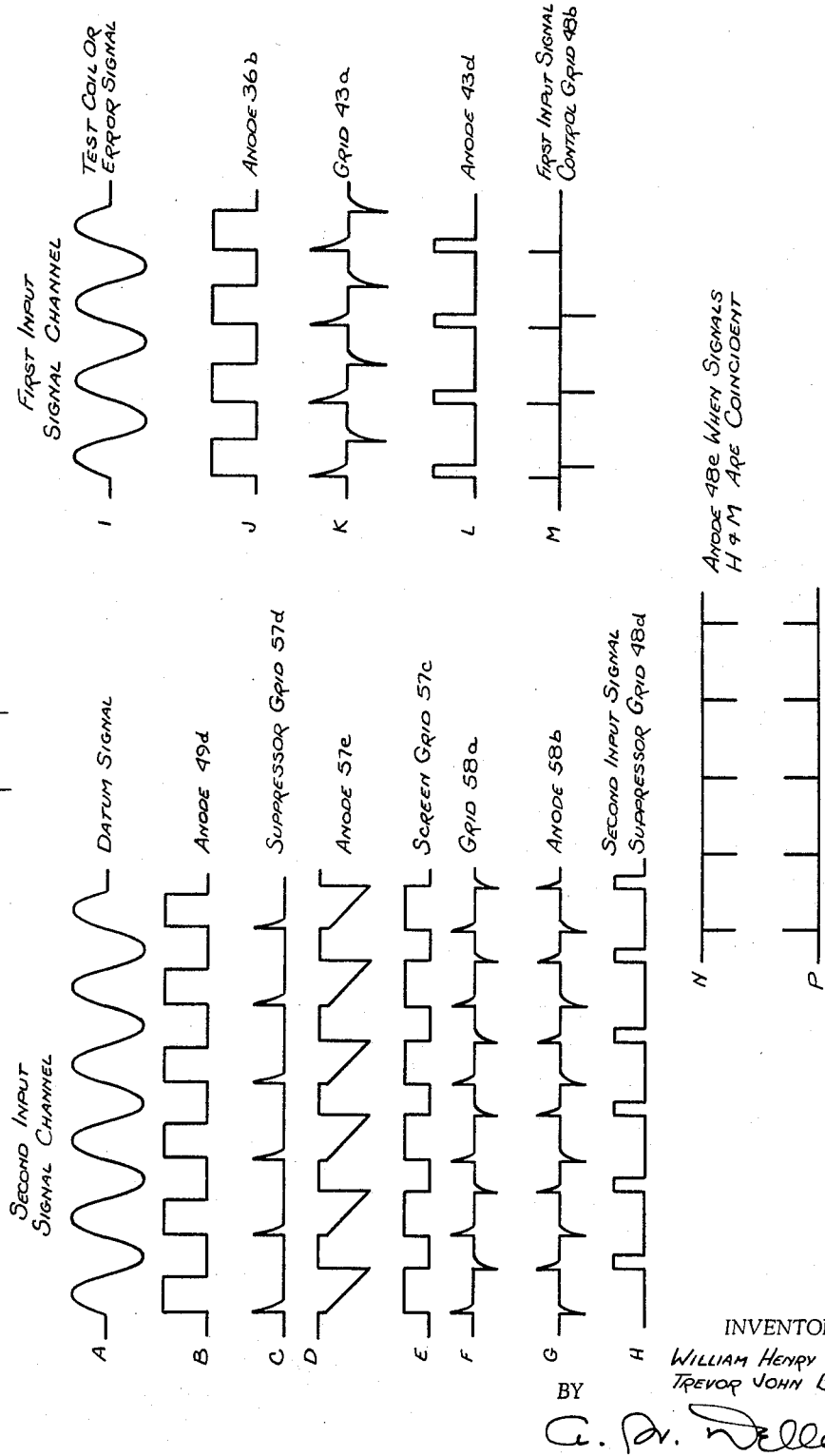

3,278,839
EDDY CURRENT APPARATUS FOR DETECTING A PARTICULAR TYPE FLAW UTILIZING PULSE COINCIDENCE DETECTION
William Henry Wells, Handsworth, Birmingham, and Trevor John Baugh, Dinmore, Bodenham, England, assignors to The International Nickel Company, Inc., New York, N.Y., a corporation of Delaware
Filed July 18, 1961, Ser. No. 126,836
Claims priority, application Great Britain, July 22, 1960, 25,639/60
12 Claims. (Cl. 324—40)

The present invention relates to eddy-current testing for detection of inhomogeneities in metallic components and more particularly to eddy-current testing for detection of inhomogeneities of preselected types in metallic components in a non-ferromagnetic condition.

It is well known that eddy-current testing has been carried out by placing an inductor excited by alternating current around or close to the metallic component being investigated and analyzing the changes of impedance of the inductor caused by inhomogeneities in the component. One of the limitations and disadvantages of this method of testing has been its non-distinguishing and indiscriminate sensitivity to inhomogeneities of so many different types, for example, those due to variations in the previous heat treatment of the component, in its chemical composition, in the dimensions of the component and in the internal stresses which are present, in addition to inhomogeneities such as cracks and inclusions. Since all of these inhomogeneities may not be sufficient cause for rejecting a particular component as unsuitable for its intended application, it is most important to be able to distinguish among and/or between them during routine inspection.

As referred to herein, the effect of a component under test or an inhomogeneity in the component upon the impedance of an electromagnetically coupled inductor is termed the impedance-effect. Further, when this impedance-effect of an inhomogeneity is a change in the phase angle of the impedance of the inductor, the inhomogeneity may be referred to as being characterized by a phase angle.

In approaching this problem, use has heretofore been made of the principle that the impedance change in an inductor can vary in magnitude and direction depending on the cause of change and the test conditions. A test coil signal or error signal derived from this impedance change is caused to vary not only in magnitude but also in phase with respect to some reference signal and will have a phase angle which is characteristic of the impedance change, and therefore, of the type of inhomogeneity. However, systems so far devised to make use of this principle have been undesirably attended by severe limitations such as the inability to discriminate clearly between inhomogeneities characterized by only slightly differing phase angles, thus giving rise to inaccurate resolution. Further, such systems suffer from the inability to respond to signals from only one type of inhomogeneity where, for example, three or more types are simultaneously present. Other systems have been restrictive in application because they can only perform on ferromagnetic bodies.

Proposals based upon a system of phase-analysis by means of phase-discriminator apparatus have also been advanced. Phase analysis in such apparatus depends upon use of well-known phase discriminators by means of which in-phase signals appear in the output with an amplitude $E_0$, a quadrature signal (90° out of phase) having a zero amplitude, and signals of intermediate phase angle ($\phi$) having an amplitude $E_0 \cos \phi$. Since amplitude varies as a cosine function, small differences in phase angles produce only small differences in signal strength. Therefore, this type of apparatus is seriously limited in accuracy of resolution.

In one known instrument a particular fault in a component is distinguished from other inhomogeneities by a system providing negative indications which ignore error signals of one given phase angle at a time. By adjusting the value of the phase angle ignored over a series of readings, it is possible to detect the presence or absence of the particular fault in the component tested, but to do this great skill and extensive calculation or experience, of an order which is not normally practicable during routine testing, are required. This is a decided disadvantage in commercial operation. Further, it is only possible to effectively eliminate completely a quadrature signal. For example, where, as is quite often the case, three inhomogeneities are present and characterized by phase angles $\phi_1$, $\phi_2$ and $\phi_3$, respectively, and only $\phi_3$ represents a defect-type inhomogeneity, it is not possible to ignore $\phi_1$ and $\phi_2$ simultaneously. This leads to confusion and unreliability of results. As the number of different types of inhomogeneities increases, it is quite obvious that the value of such an instrument as an inspection device is further negatived. Moreover, since the phase angle for certain types of defects, e.g., a radial stress crack, is not constant for variations in magnitude, e.g., crack depth, instruments which cannot be used to inspect for the presence of inhomogeneities characterized by a band of phase angles in one operation are at a serious disadvantage.

Thus, conventional prior art instruments provide inhomogeneity analysis only on a strictly limited basis and usually for metal bodies which are known to be uniform except for the possible presence of radial stress cracks and dimensional changes (or any two such variables). Although many attempts were made to overcome the foregoing difficulties and disadvantages, none, as far as we are aware, was entirely successful when carried into practice commercially on an industrial scale.

It has now been discovered that the presence of inhomogeneities of preselected types, e.g., discontinuities, inclusions, etc., in metallic components, particularly those in the non-ferromagnetic condition, can be detected by routine inspection procedures with a high degree of accuracy without confusion arising from the presence of inhomogeneities of other types by use of special apparatus and/or processes which indicate in a positive manner the presence of an inhomogeneity characterized by an impedance change of a particular phase angle or band of phase angles, and which are capable of ignoring inhomogeneities characterized by not only one but all other phase angles. The invention is directed to the testing of non-ferromagnetic components but can be used for testing ferromagnetic components if domain phenomena are taken into account in the interpretation of the results recorded, or if the component is placed in a non-ferromagnetic condition by being magnetically saturated during the test. Thus, for example, a ferromagnetic component can be placed in a non-ferromagnetic condition by subjecting it to the field of a direct current magnet.

Difficulties heretofore attendant eddy-current testing by means of conventional systems are eliminated or greatly minimized. Thus, the lack of capability to discriminate between inhomogeneities characterized by slightly differing phase angles, or the lack of capability to respond to signals from only one type of inhomogeneity where, for example, three or more types are present, or the lack of capability of being applied to materials in a non-ferromagnetic condition are overcome. In accordance with the present invention, signals of all phase angles except those under investigation can be ignored, and signals within as broad a band as desired can be detected, e.g., a band of phase angles varying continuously from about 2.5 to 360°. Further, a signal characteristic of the magnitude of the detected signal can be obtained, if desired. If harmful effects are known to appear at phase angles of 0 to 45° but other inhomogeneities are outside this range, it is possible with considerable facility to display only signals within this range. This lends to considerable flexibility in commercial operation.

It is an object of the present invention to provide apparatus for detecting inhomogeneities of preselected types in metallic components.

Another object of the invention is to provide apparatus for indicating the presence of inhomogeneities of preselected types in metallic components in a non-ferromagnetic condition with greatly improved capability of distinguishing between inhomogeneities of different types.

The invention also contemplates providing apparatus for testing metallic components in the non-ferromagnetic condition which is responsive with a high degree of discrimination in respect of the phase angle of the impedance change resulting from the presence of a particular type of inhomogeneity.

It is a further object of the invention to provide apparatus not only capable of detecting the presence of an inhomogeneity in a metallic component in the non-ferromagnetic condition but also capable of thereafter determining the type of the detected inhomogeneity.

The invention further contemplates providing a process for indicating the presence in a metallic component of an inhomogeneity of a selected type without generating spurious indications arising from the presence of inhomogeneities of other types.

It is another object of the invention to provide a process for detecting inhomogeneities in a metallic component in a non-ferromagnetic condition and determining the type of the detected inhomogeneity.

Other objects and advantages will become apparent from the following description taken in conjunction with the accompanying drawing in which:

FIG. 1 is a block schematic diagram of an illustrative embodiment of apparatus contemplated within the scope of the invention;

FIG. 2 is a schematic circuit diagram of the bridge and bridge balancing circuits shown in FIG. 1;

FIGS. 3 and 4 represent schematic diagrams of the circuits, other than the bridge and bridge-balancing circuits, shown in FIG. 1; and FIG. 5 illustrates various wave and pulse shapes of electric signals produced by the apparatus.

Figure 2A:
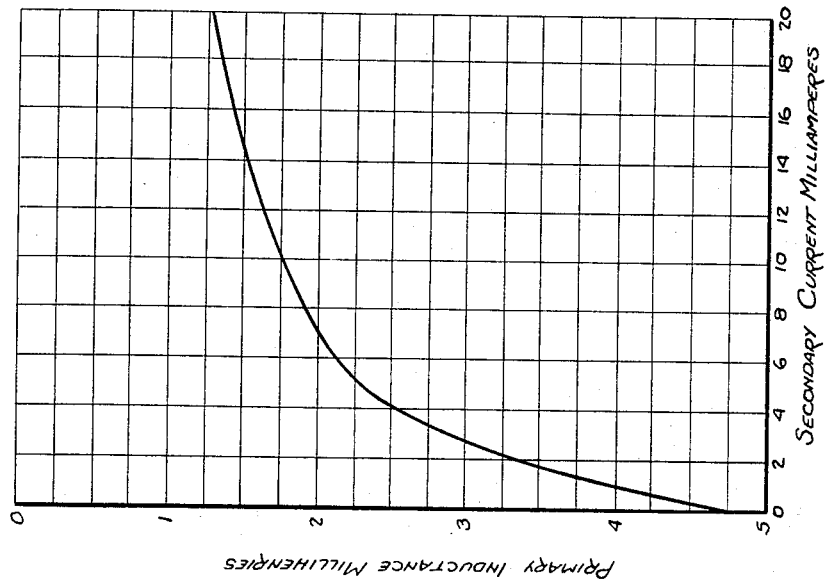
FIG. 2a shows the variation of Primary Inductance versus Secondary Current of the controllable inductance with the core shown in FIG. 2.

Broadly speaking, the present invention contemplates detection of inhomogeneities of preselected types in a metallic component by use of a test coil adapted to be electromagnetically coupled to the metallic component to be tested to generate an electric signal, i.e., the test coil signal, dependent in magnitude and phase on variations of the impedance of the test coil caused by an inhomogeneity in the scanned part of the metallic component, the phase of the said electric signal being characteristic of the type of the detected inhomogeneity, and coincidence means for receiving a first input signal which is derived from the test coil signal and the timing of which is dependent on the phase of the test coil signal and for receiving a second input signal in the form of an alternating reference signal, i.e., a signal comprising discrete pulses, which permits the coincidence means to respond to the first input signal only during the period of each cycle of the second input signal which defines the interval during which the first input signal would be generated if an inhomogeneity of a selected type under investigation were detected, the coincidence means providing an indication when the first input signal substantially coincides with one of the said intervals.

In accordance with the invention, there is provided a plurality of channels which are circuits adapted to generate, modify or conduct electric signals for developing the aforementioned first and second input signals and for discriminating between and/or among signals characteristic of various types of inhomogeneities. Datum signals are initially generated by a source of sinusoidally alternating current and are transmitted to signal developing channels and converted to various forms of pulsed signals. It is to be understood, in accordance with the invention, that pulsed signals are discrete signals not representative by a cycle or portion of a cycle of a single sinusoidal variable, but are of forms such as the square waves, voltage peaks, ramp voltages and the like shown in FIG. 5.

A first input signal channel is provided to develop the first input signal and includes a test coil and pulse signal forming means for transmitting a pulsed signal. Means are also provided for receiving a datum signal from the current source and causing this signal to energize the test coil. In operation, the test coil, when coupled to the test component, transmits a sinusoidal test coil signal of phase or timing, i.e., timing with respect to the datum signal, characteristic of the impedance-effect of the test component. The pulse signal forming means is a circuit, i.e., a signal squaring circuit, capable of receiving a sinusoidal signal and transmitting a pulse signal dependent in timing upon the timing of the sinusoidal signal received, and essentially independent of the magnitude thereof. In operation, this pulse means transmits a pulsed signal derived from the test coil signal and dependent in timing upon the timing of the test coil signal. This derived signal is the first input signal which is transmitted at the output of he first input channel. Since it is dependent in timing upon the test coil signal, its time-relation to the datum signal, i.e., its timing, is indicative of the impedance-effect of the test component. To provide precise indication of this time relation, the pulse means can advantageously include signal sharpening circuit means, such as differentiating networks and pulse generators.

A second input signal channel is provided to develop the second input signal and includes means for receiving a sinusoidal (datum) signal, means for transmitting a pulsed signal at the channel output, means for controlling the initiation time of the transmitted signal with respect to the timing of the datum signal, and means for controlling the duration of the transmitted signal. The sinusoidal signal received is a datum signal from the current source, and the transmitted pulsed signal is the aforementioned second input signal. By controlling its duration and initiation time, the second input signal is calibrated to be definitive of the time interval during which first input signals derived from test coil signals characteristic of a preselected type of inhomogeneity are transmitted, i.e., this time interval is characteristic of the preselected inhomogeneity. The aforementioned means comprising the second input channel can be a signal squaring circuit, a ocntrollable time-delay signal generating circuit, and a controllable-duration signal squaring circuit arranged in series in the stated sequence. Advantageously, signal sharpening circuits can be included in the second input channel to achieve more precise timing of the second input signal.

The coincidence means which receives the first and second input signals is a discriminative channel adapted to transmit a coincidence signal when the first and second input signals are received simultaneously. Since the timing of the first input signal is characteristic of the impedance-effect of the test components, and since the time interval of the second input signal is definitive of the time during which a preselected type of inhomogeneity will, if present, cause a first input signal to be transmitted, simultaneous reception of these signals will occur when a preselected type of inhomogeneity is present in the coupled portion of the test component. The coincidence signal, therefore, is an indication that a preselected type of inhomogeneity is present in the portion of the component being tested. This indication is very simply interpreted since it either occurs completely, or not at all, and avoids difficulties of interpreting degrees of signal strength.

Highly accurate discrimination between inhomogeneities which are characterized by very small differences in impedance-effect is achieved since the invention is based upon time relation of pulses rather than phase analysis by phase discriminators or wave interference. By use of discrete pulses as signals which are produced precisely in accordance with the invention, the phase angle impedance-effect of the test component is characterized accurately by the first input signal and the time interval characteristic of a preselected type of inhomogeneity is capable of being defined very accurately by the second input signal. Since in the discriminator channel, coincidence circuit means are provided which discriminate accurately between signals which either are or are not received simultaneously and which respond only when the signals are coincident, the use of the aforementioned electric pulse signaling means in combination with the coincidence means provides for eddy-current type flaw detection of a high degree of precision with results that are simple to interpret. The invention achieves flexibility in providing for elimination of confusing signals resulting from a wide variety of inhomogeneities not of interest, while concurrently providing for positive indication of the presence of preselected types of inhomogeneities of interest by utilizing the aforementioned means for controlling the duration and initiation-time of the second input signal. Thus, the confusion arising from the inability of prior art systems capable of producing only a null type or negative indication in discriminating where more than two types of inhomogeneities were present is eliminated or greatly minimized.

Flexibility is also achieved in the sense that the invention can be successfully applied for the purpose of detecting inhomogeneities which are characterized by relatively broad bands of phase angles. Thus, by adjustment of the means for control of duration of the second input signal, the invention can be calibrated to indicate the presence of inhomogeneities characterized by any selected band of phase angles. An additional advantage is that satisfactory performance of the invention is not detrimentally affected by impedance-effects resulting in variations in test coil signal magnitude, since the timing of the pulse signals developed by the pulse forming means in the first input channel is dependent essentially upon only the timing of the test coil signal. The invention can be successfully applied to metallic components in a non-ferromagnetic condition since the input channels are specially designed for operation when the datum and test coil signals are of sinusoidal wave form.

In carrying the invention into practice, it is preferred and most advantageous to include in the discriminative channel gating means capable of transmitting an output signal which is proportional to the test coil signal at the point of time when the coincidence means responds to the first input signal. Since this output signal is proportional to the test coil signal, more accurate discrimination as to type of inhomogeneity and, in addition, a highly informative indication of the size of the inhomogeneity is achieved. Thus, greater discriminating power is provided as compared with conventional apparatus heretofore proposed.

In a further preferred embodiment of the invention, greater and improved discrimination is achieved by employing a bridge circuit means, particularly in combination with bridge-balancing circuit means. The bridge circuit, whether or not in combination with the bridge-balancing circuit, includes the test coil and is adapted to be balanced such that the test coil signal is nullified when the portion of the metallic component under test is uniform, and is capable of transmitting a substantially sinusoidal error (bridge) signal proportional to the test coil signal at the bridge circuit output when a portion of the component which contains an inhomogeneity is within sensing distance of the test coil. Since the error signal is of the same wave form as and is proportional to the test coil signal, it will be understood that the same subsequent electrical operations can be performed on either the test coil signal or the error signal to produce similar results.

The optimum degree of discrimination is achieved in accordance with the invention when a bridge-balancing circuit means is employed in combination with the bridge. In this advantageous embodiment, the bridge is adapted to be automatically balanced by the balancing circuit with time delays being included in this combination to provide for automatic balancing when an inhomogeneity in the component is of a gradually changing nature, and to transmit an error signal when the inhomogeneity is discrete, e.g., cracks, inclusions, voids, scores and abrupt changes of section. Thus, in the past, where gradually varying inhomogeneities were present in a metal component and were not of significance with regard to rejecting the component as defective, varying signals of a confusing nature were still produced and were exceedingly difficult to ignore or nullify because past equipment was capable of nullifying only signals of a constant nature. The present invention overcomes this problem and now provides for continuously nullifying these varying signals and eliminating this source of confusion.

Further, the invention advantageously provides for operation at a variety of frequencies of voltage waves and pulses. The apparatus operates at a fixed frequency for a given set of test conditions, but, of course, it is necessary to select the frequency of operation of the apparatus with reference to the size, shape and electrical conductivity of the component to be tested. Typical frequencies employed are in the range of 1–50 kc./s., but a wider range of frequencies could be used. The subject of the effect of operating frequencies upon eddy-current testing is well understood by those skilled in the art and has been dealt with in publications and is therefore not treated in detail herein.

For the purpose of giving those skilled in the art a better understanding and appreciation of the invention, reference is made to the drawing which sets forth an illustrative embodiment of the invention.

Referring to FIG. 1, Oscillator 11, which may be a crystal controlled heterodyne oscillator capable of operating at frequencies of 1, 5, 10 and 50 kilocycles per second, transmits a sinusoidal datum signal and is connected to the input of the First Input Signal Channel comprised of Bridge circuits 12 including Test Coil 13, Amplifier 14, Bridge Balancing Circuit 15, and Error Signal Squarer 18, and also to the input of the Second Input Signal Channel comprised of the circuits Datum Signal Squarer 16, Phantastron Delay 17, and Resolution Control 19, the circuits being connected in the manner shown.

Signal Squarers 16 and 18 are signal squaring circuits and, as are other signal squaring circuits referred to hereinafter, are of the type which transmit a discrete pulse each time they receive an input signal. Trigger circuits, triggered pulse generators, one-shot multivibrators and the like, are illustrative of such circuits. Resolution Control 19 is a controllable-duration signal squaring circuit including provision for controlling the duration of the pulse, and can be of a type similar to the aforementioned signal squaring circuits with the addition of a variable resistor. Phantastron Delay 17 is advantageously a type of phantastron circuit which produces a pulse signal with a sharp cut-off, i.e., a sharp trailing edge, with provision for control of the cut-off time. Other time-delay signal generating means which produce a sharply defined output signal with a time-delay controllable in relation to the time at which an input signal is received can also be used. Such circuits include Miller integrators, Thyratron time bases, Bootstrap time bases, etc.

Both the First Input and Second Input Signal Channels have input-signal outputs connected as shown to the Discriminative Channel (the coincidence means) which, in this illustrative embodiment of the invention, comprises Coincidence Circuit 20 connected to Error Signal Gate 21 and to pole 23b of Switch 23. The First Input Signal Channel also has outputs connected as shown to Error Signal Gate 21, Meter Display 22, and pole 23a of Switch 23. The connection of the First Input Signal Channel to pole 23a of Switch 23 comprises the Absolute Channel. Switch 23 connects Recorder Amplifier 24 to the outputs of either the Discriminative Channel or the Absolute Channel. Fault Warning Trigger 25 and Recorder 26 are each connected to the output of Recorder Amplifier 24.

Referring to FIG. 2, it will be seen that a probe or test coil, designated as Test Coil 13, is connected as part of Bridge 12 and is a solenoid placed near or around the test part. In this example, it consists of a single self-excited coil, but in other embodiments there may be more than one self-excited sensing coil, it will be appreciated that for this type of bridge circuit separately excited sensing coils must not be used in that the arm containing the said coil is essentially excited at the resonant frequency. The geometric form of the test coil depends upon the application, i.e., the form of test part and orientation of defects. Considering a cylindrical bar or tube, a typical coil unit consists of a sensing coil mounted concentrically with the bar, the coil being supplied with alternating current from Oscillator 11 via transformer 27. The sensing coil is connected in Bridge 12 so that when the core (test bar) is uniform, the bridge output is zero. If the test bar is now moved so that a short defect or inhomogeneity is within the influence of the test Coil 13, the bridge becomes unbalanced because of an impedance change of the coil, and an alternating voltage appears at the bridge output terminals. This error voltage, i.e., the Error Signal (FIG. 5I), from the bridge circuit is characterized not only by its magnitude but also by its phase angle.

Figure 2B:
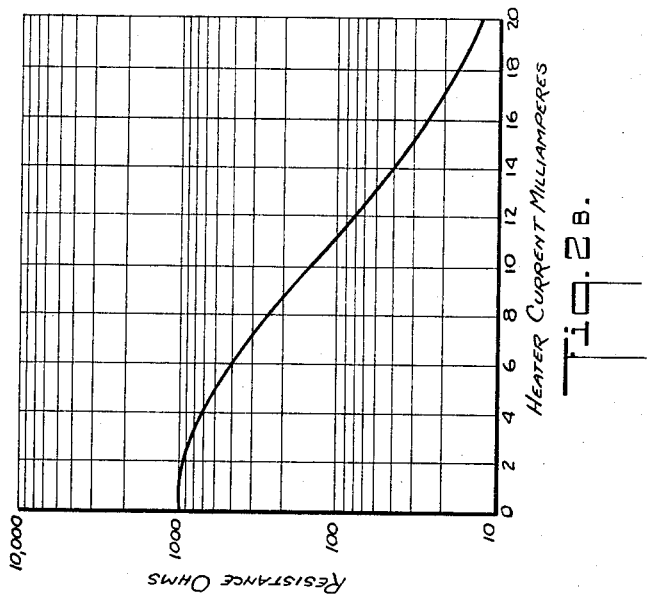
FIG. 2b shows the variation of Resistance versus Heater Current of the thermistor 30 shown in FIG. 2.

Bridge 12 is of the resonant type in which three of the branches contain fixed resistors 28, 29 and a controllable resistance such as thermistor 30, respectively. The fourth branch contains variable capacitor 31, Test Coil 13, and a controllable inductor such as toroidal transductor 32. Transductor 32, with a primary inductance of approximately 10% that of Test Coil 13, is wound on core 32a of a nickel-iron alloy consisting essentially of about 77% nickel, about 14% iron, about 5% copper and about 4% molybdenum. Automatic balancing of the bridge circuit to provide a null when the test piece is homogeneous and to ignore gradual changes in the impedance of the test piece is accomplished by Bridge Balancing Circuit 15 which is fed by Oscillator 11 to vary the current supplied to the heating element of thermistor 30 and the secondary of transductor 32. When an unbalanced condition arises in Bridge 12, the bridge error signal appearing at the output of Bridge 12 is amplified by Amplifier 14. Amplifier 14 can be any suitable amplifier known in the art as having high gain and selectivity at the particular working frequency and is therefore not shown in detail. Signals appearing at the output 33 of Amplifier 14 are fed back to control input 34 of the Transductor Current Supply Circuit, and also to control input 35 of the Thermistor Current Supply Circuit. By feed-back action the current flowing in secondary AA is controlled to vary the primary inductance of transductor 32 as shown in FIG. 2a. In the same manner, resistive balance is accomplished by feed-back control of current through heater BB of thermistor 30, this thermistor having a resistance which varies according to the heater current, as shown in FIG. 2B. Correct phase relations are maintained by the two discriminator circuits and control voltages are derived from these circuits shown in FIG. 2 as the Transductor and Thermistor current supply circuits. Thus, if a bridge error signal resulting from an increase in impedance of the test specimen appears at output 33, the bridge will be driven to balance by an increase in secondary current through AA with a consequent decrease in primary inductance of transductor 32 and by an increase in current through BB with a consequent decrease in resistance of thermistor 30. Balance conditions will be obtained in the bridge when the following relationships are satisfied:

(1)
$$2\pi fL = \frac{1}{2\pi fC}$$

(2)
$$\frac{Zcd}{Zbc} = \frac{Zda}{Zab}$$

where $f$ is the frequency of the alternating current supplied to the bridge, $L$ is the combined inductance of the test coil and the primary coil of the variable transductor, $C$ is the capacitance of the variable condenser in bridge leg $cd$, and $Z$ is the impedance of each leg of the bridge as designated by the subscript letters.

In this embodiment at a frequency ($f$) of 10 kilocycles resistors 28 and 29 have resistances of about 600 ohms, the combined resistance of the test coil and the transductor primary is about 200 ohms and the inductance of the test coil without a test piece inserted in the core is about 40 millihenries. These values will change appropriately with change of frequency. However, it will be readily understood by those skilled in the art that other resistances and inductances could be used with thermistors and inductors having other characteristics. The range of capacitance of the variable condenser is simply chosen by making it equal to that required to satisfy the aforementioned relationship $$2\pi fL = \frac{1}{2\pi fC}$$

over the range of frequencies and inductances within which the apparatus is desired to operate.

If in the above described bridge sytem the loop delay was zero, no bridge error signal would appear for subsequent signaling purposes. In order to detect defects there must be some delay between the incidence of an error signal and the reaction of control elements in the bridge. Thermistor 30 introduces a delay by virtue of its construction and an artificial delay is built into the reactive control system by adjustment of circuit time constants shown in FIG. 2 as resistors 102 and 104 and capacitors 103 and 105. These resistor-capacitor pairs have a time constant of approximately 0.8 second. The overall delay is adjusted so that gradual changes in test piece properties such as heat treatment, internal stress and chemical composition are ignored but defects such as cracks, which result in error signals with a relatively steep leading edge, are detected. This overall delay can be adjusted to suit particular test requirements, such as by adjusting the said time constants. The operation of Bridge Balancing Circuit 15 in automatically balancing Bridge Circuit 12 is as follows:

Error signals from bridge 12 via amplifier 14 are fed to two phase discriminators 34 and 35. Datum signals are also fed to discriminators 34 and 35 from oscillator 11. The circuit comprising resistors 91, 92 and 93 and capacitor 94 is a bridge type 180° phase shifter; similarly the circuit comprising resistors 95, 96, 97 and capacitor 98 is a second phase shifter. Adjustment of the two phase shifters ensures that datum signals supplied to the two discriminative circuits 34 and 35 are distinguished by a relative phase angle of 90°. Accordingly, Discriminator 34 has zero output when the error signal is in phase with the datum signal from oscillator 11. Discriminator 35 has zero output when the error signal is in quadrature with the datum signal from oscillator 11. Error signals of intermediate phase angles cause both discriminators 34 and 35 to act in the appropriate direction as to drive the bridge 12 to balance. In ideal circuits only one 90° phase shifter would be necessary to produce a quadrature datum signal but a second phase shifter is included to allow for the effect of spurious circuit phase shifts.

By providing for the automatic balancing of Bridge Circuit 12, the bridge is thus adapted to be always maintained at its most sensitive operating point and will only respond to defects which are discrete. If it is necessary to detect gradual changes as opposed to discrete changes in the impedance of the test piece, manipulation of switch 101 from position 101a to position 101b will convert the bridge from automatic to manual operation. Manual operation of the bridge may be accomplished by adjusting capacitor 31 and resistor 100 to cause the bridge to balance.

Meter Display 22, which can be an alternating current voltmeter, is connected to the output of Amplifier 14 to permit monitoring of all signals from the bridge when desired.

As shown in FIG. 1, error signals from Amplifier 14 are transmitted to Error Signal Squarer 18 and to either the Discriminative Channel or the Absolute Channel, depending upon the position of Switch 23. Use of the Discriminative Channel provides for selective flaw detection wherein discrimination between different types of flaws is achieved and the presence of only those flaws characterized by an impedance change resulting in phase changes within a preselected band is reported, as hereinafter described. Alternatively, use of the Absolute Channel disconnects the discriminating circuits and causes the display of all error signals of whatever phase angle.

Referring to FIG. 3, it will be seen that error signals continuing through the First Input Signal Channel are transmitted to the input of Error Signal Squarer 18 at grid 36a of tube 36, which is a double triode tube such as a 12AX7. Passing successively through tube 36 and condenser 37 to grid 36b, and thence again through tube 36 to condenser 38, the entering sinusoidal error signal (FIG. 5I) is amplified and squared to produce a square pulse (FIG. 5J) synchronous with the Error Signal. Pulse signals synchronous with sinusoidal signals are each initiated when the sinusoidal signals are at the same phase angle, whereas pulse signals synchronous with other pulse signals are coincident in time. This square pulse (FIG. 5J) is differentiated by passing through condenser 38 and across shunt resistor 39. The resulting pulse (FIG. 5K) is transmitted through coupling condenser 40 to grid 43a, where its leading edge triggers pulse generator tube 43, which is a double triode such as an E88CC. Control over the bias of grid 43a is provided by potentiometer 42 in series with resistor 41. Tube 43, with condenser 44 connecting anode 43b to grid 43c, produces an output voltage pulse of short duration (FIG. 5L) at anode 43d. This pulse is fed via a differentiating network comprising condenser 45 and resistor 46 to the output of Error Signal Squarer 18, which is also the output of the First Input Channel. The pulse arriving at the output of the First Input Channel is the First Input Signal and is of a very narrow peak (FIG. 5M). Since it is derived from the test coil signal through the aforedescribed pulse generating circuits, its timing is dependent upon the phase of the test coil signal, and its magnitude is substantially independent of the magnitude of the test coil signal.

As previously mentioned and in accordance with the invention, the Second Input Channel of the instrument provides for the elimination of all the error signals except those of a particular phase angle or band of phase angles, the band width and position being chosen by the operator to suit the type of inspection required, i.e., preselection. The instrument can be set up to respond only to signals caused by cracks in the component under investigation and to ignore, for example, variations in dimensions, heat treatment and internal stress. Alternatively, on the receipt of a signal through the Absolute Channel, the Second Input Channel of the instrument can then be employed and adjusted to determine the type of inhomogeneity which caused it.

Control over the band width and position of the phase angles to which the instrument will respond is provided by the Second Input Signal Channel. It is also advantageous that the Second Input Channel include means for varying the band of phase angles which is observed by the apparatus in both position and width to enable more than one type of inhomogeneity to be investigated and varying degrees of resolution to be employed. The output signal of Oscillator 11 is employed as a Datum Signal (FIG. 5A) and is fed to Datum Signal Squarer 16 at grid 49a, which is the input of the Second Input Signal Channel. Tube 49 is a double triode such as an E88CC and has condenser 50 and resistor 51 connected across anode 49b and grid 49c in the manner of the well known Schmidt trigger circuit. The Datum Signal is used to trigger this Schmidt circuit to produce at anode 49d a datum square pulse signal (FIG. 5B) which is synchronous with the Datum Signal. Datum Signal Squarer 16 and Error Signal Squarer 18 are adapted to be triggered at the same phase angle of each of their respective sinusoidal input signals, although equivalent operation could be produced using different phase angles for triggering and making a compensating adjustment in the time-delay signal generating circuit. The square pulse from anode 49d is differentiated by passing through condenser 52 and across resistor 53, resistor 53 being shunted by diode 54 such as an 0A5, to eliminate any negative component of the signal. The pulse is then clipped when passed through diode 55, which also may be an 0A5 and which is connected to the output of Datum Signal Squarer 16.

The input to Phantastron Delay 17 is connected to the output of Datum Signal Squarer 16. The pulsed datum signal from 16 is fed through condenser 56 at the input of the Phantastron Delay and then to suppressor grid 57d of tube 57, at which point the pulse has the wave form shown in FIG. 5C. Tube 57 is a pentode such as a 6F33. Provision for suitably adjusting the bias of suppressor grid 57d can be accomplished, if desired, by connecting a potentiometer to the suppressor grid. Prior to the arrival of the aforementioned pulse at the suppressor grid, the space current in tube 57 flows from cathode 57a to screen grid 57c. The positive leading edge of the pulse triggers the suppressor grid by raising its potential and switching space current flow from grid 57c to anode 57e. This switching action, together with the feed-back action via tube 58 to grid 57b, produces a ramp voltage (FIG. 5D), the run-down rate of which is governed by resistor 59, potentiometer 60, and one of the condensers 61, 62, 63 or 64. Diode 66 is inserted in the anode circuit for the purpose of defining the time interval of the ramp determined by settings of potentiometer 60 and may be a tube such as an EB91. A selection of condensers is provided by switch 65 to enable operation at one of four test frequencies, such as 1, 5, 10 or 50 kilocycles per second.

The circuit comprising tubes 57 and 66, resistor 59, potentiometer 60, condenser 61, 62, 63 or 64, and the associated circuit elements shown in FIG. 3 is basically a phantastron circuit. The circuit leading from condensers 61, 62, 63 or 64 to tube 58 and thence to grid 57b, and its associated circuit elements function to provide a low impedance feed-back path to control grid 57b of tube 57 and to determine the potential of control grid 57b in the following manner: Cathode of tube 58 and hence control grid 57b of tube 57 is maintained at a fixed potential determined by the space current in tube 58 which then acts as a cathode follower.

Although, theoretically the test frequency should be continuously variable over a wide range, this condition is difficult and unnecessary to achieve in practice. However, in accordance with the invention, means are provided for selection of spot frequencies so that the operating point (the point on the impedance plane) is thus controllable to avoid a degree of variation sufficient to cause ambiguity. A particular group of frequencies for a given field of work can be chosen by suitably adjusting circuit components, as hereinafter described.

The switching of the space current from screen grid 57c to the anode 57e produces a square pulse at screen grid 57c (FIG. 5E) with the same time interval as the run-down period of the anode pulse, the trailing edge of the screen grid pulse being coincident with the completion of the run-down period. Since the timing of the anode pulse is a function of the timing of the sinusoidal Datum Signal originating in Oscillator 11, the control of the timing of the trailing edge of the screen grid pulse exercised by adjustment of potentiometer 60 provides control of a signal coincident in time with the moment when the Datum Signal is passing through any chosen angle of its phase. Thus, potentiometer 60 operates as the Phase Signal Control, and the trailing edge of the screen grid pulse is the Phase Signal.

The screen grid pulse is differentiated by passing through condenser 67 and across shunt resistance 68, and the resulting pulse train (FIG. 5F) is fed to grid 58a of tube 58. Tube 58 can be a double triode such as an E88CC. The pulse train is inverted by passing through tube 58 so as to make the transformed Phase Signal, which became the negative pulse resulting from the trailing edge of the screen grid pulse, a positive pulse (FIG. 5G). This positive version of the Phase Signal, which is developed at anode 58b, is fed through condenser 69 to the output of the Phantastron Delay.

The input of the Resolution Control is connected to the output of the Phantastron Delay, and the Phase Signal is received at grid 70a of the tube 70. Tube 70 is a double triode such as an E88CC and, with its associated circuit elements, operates as a pulse generator, the receiving grid being biased by resistor 71 and potentiometer 72.

Potentiometer 73 is adjustable so that pulse generator 70 only generates pulses synchronously with trigger pulses applied to control grid 70a. This pulse generating circuit is provided with a selection of condensers 74, 75, 76 and 77 by positioning of switch 73 to provide for operation of the instrument at one of four test frequencies, such as 1, 5, 10 and 50 kilocycles per second. Control over the duration of the pulse is provided by variable resistor 78, termed the Resolution Control. This resistor, in series with resistors 79 and 80, controls the charging rate of the selected condenser 74, 75, 76 or 77, thereby determining the instant at which grid 70c switches the cathode current from anode 70b to anode 70d and ends the duration of the pulse. Thus, the phase signal is converted from a sharply peaked pulse (FIG. 5G) to a square pulse (FIG. 5H), with the time of initiation determined by the setting of the Phase Signal Control 60, and the duration determined by the setting of the Resolution Control 78. This square pulse is the second Input Signal, and since its initiation is a function of a selected phase of the sinusoidal Datum Signal, the time period of the Second Input Signal is used to signal the time during which the Datum Signal is passing through a selected band of phase angles. This input signal is passed through coupling condenser 81 to the output of the Resolution Control Circuit, which is also the output of the Second Input Signal Channel.

The Second Input Signal is fed to an input of the Discriminative Channel at the input of the Coincidence Circuit 20 connected to suppressor grid 48d of tube 48. The First Input Signal is fed to another input of the Discriminative Channel at the input of the Coincidence Circuit connected to condenser 47 coupled to control grid 48b of tube 48. This tube is a pentode such as a 6F33. The screen grid 48c is connected to the B+ voltage line and prevents current from flowing from cathode 48a to anode 48e during periods when a Second Input Signal is not being received at suppressor grid 48d. Anode current will also be cut off when no signal is being received at control grid 48b. However, when the First and Second Input Signals are coincident, a narrow negative pulse, i.e., the Coincidence Signal (FIG. 5N), will be passed by the anode 48e. In terms of test results, this pulse will occur only when the Test Coil 13 develops a signal with a phase angle which is within the band of phase angles selected by the settings of Phase Signal Control 60 and Resolution Control 76, and therefore only when a defect of the type for which the apparatus has been set to inspect is present in the portion of the test piece within sensing distance of the test coil.

The resolution of the apparatus, i.e., the band of phase angles during which coincidence occurs, can be adjusted by varying the length of pulses supplied to the coincidence circuit. Theoretically, a single phase angle could be selected if these pulses could be made infinitely narrow but in practice the degree of resolution depends on the minimum width of pulses which can be produced by the differentiating circuits. A resolution of a phase band of 2.5 degrees can easily be obtained at 50 kc./s.

Referring to FIG. 4, it can be seen that the negative pulse from anode 48e, the Coincidence Signal, is fed to grid 82a of tube 82. This tube is a triode, or one-half of a double triode such as an E88CC. The Coincidence Signal is amplified and inverted by tube 82 and its associated circuitry to regenerate the Coincidence Signal as a positive pulse (FIG. 5P). This positive version of the Coincidence Signal passes through coupling condenser 83 to the output of the Coincidence Circuit.

An input to Error Signal Gate 21 at grid 84a in one-half of tube 84 is connected to the output of the Coincidence Circuit, and receives the positive Coincidence Signal. Tube 84 is a double triode such as an E88CC. The coincidence signal causes a large positive going pulse to be developed across cathode resistor 85. This pulse is rectified by rectifier 86, which may be a diode such as an 0A5, and is fed to suppressor grid 87d of tube 87. This tube, which is a pentode such as a 6F33, is in a non-conducting state when no grid signals are being received. The control grid 87b is connected through potentiometer 88 to another input to the Error Signal Gate 21. This input is connected to the output of Amplifier 14 and receives the sinusoidal Error Signal originating in the test coil. When no signal is being received at the suppressor grid of tube 87, the Error Signal cannot cause space current to flow from cathode 87a to anode 87e, since screen grid 87c is connected to the B+ voltage line. When the suppressor grid potential is lifted by the positive going pulse developed across resistor 85, space current is allowed to pass from the cathode to the anode upon coincident receipt of the Error Signal at the control grid. The anode then passes a signal proportional to the Error Signal. This anode signal passes through coupling condenser 89 to grid 84b, which in this example is in the other half of double triode 84, and is amplified by this half of tube 84 and its associated circuitry to produce an output signal across cathode resistor 90. The output of the Error Signal Gate, which is also the output of the Discriminative Channel, is connected across cathode resistor 90.

The output of the Discriminative Channel is connected to contact 23b of Switch 23 to provide for transmission of the output signal of this channel to various warning means. As shown in FIG. 1, Switch 23, when positioned to contact 23b, connects the Discriminative Channel to the input of Recorder Amplifier 24, which has its output connected to Fault Warning Trigger 25 and Recorder 26. The Fault Warning Trigger may be any known type of relay device suitable for operating warning signals such as lights, horns or bells and/or marking devices such as ink stampers and paint spray guns. Likewise, the Recorder 26 may be any known type of device for recording an electrical signal. In addition, an oscilloscope (not shown) can be connected to Switch 23 to permit study of the wave shape of the Error Signal. Obviously, when the Bridge Balancing Circuit is employed it will be advantageous to disconnect it during an oscilloscope study in order to obtain a steady-state condition of the Error Signal. Since, in accordance with preferred embodiments of the invention, the aforedescribed embodiment being illustrative, the Discriminative Channel output signal is proportional to the error signal, or to the test coil signal if no bridge is used, the warning means can be adapted to operate only when the aforesaid output signal is of magnitude at least equal to a threshold value. Thus, these advantageous embodiments of the invention provide greater discriminating power.

In preparing to use the apparatus of the invention for inspection of metal articles, it is necessary to calibrate the apparatus to determine the phase angle of the impedance change caused by the detection of each of the different inhomogeneities that the apparatus will be required to investigate. This may be done, for example, by preparing specimens or models of mercury containing discontinuities of the types expected to be found in the component to be tested and observing the respective phases of the impedance changes of the inductor produced when they are investigated by the apparatus. Once these impedance changes are known, the time delay and duration required for Second Input Signals corresponding to the various types of inhomogeneities of interest may be computed by phase analysis techniques. The apparatus can then be set up for discriminating inspection of a selected type of inhomogeneity by setting the Phase Signal Control and Resolution Control to produce the calibrated Second Input Signal and operating the apparatus with the aforementioned switches set to send Error Signals through the Discriminative channel.

Another method of calibration is to introduce samples of metal articles with known types of inhomogeneities, such as cracks detected by X-ray inspection, into the test coil with the apparatus operating on the Discriminative Channel. The settings of the Phase Signal Control and the Resolution Control are then varied while observing operation of the warning device, and the control settings required to cause the apparatus to respond to each type of defect with a maximum degree of discrimination are noted. The apparatus can also be calibrated for use in inspecting for a plurality of types of defects in situations where a group of defect types are all characterized by error signals within a band of phase angles which is not coincident with any of the phase angles of signals which would be generated by the presence of other types of inhomogeneities. This can be accomplished by setting the Resolution Control to provide sufficient duration of the Second Input Signal. Thus, if harmful defects have been found to appear at phase angles of from 0°–45°, and other inhomogeneities are outside this range, it is possible by simple manipulation of the controls to display only signals within this range.

The method of calibration of the instrument is not critical and persons skilled in the art can undoubtedly devise various routine methods of calibration which can be performed by other persons with much less skill. Obviously, the calibration operation need not be performed every time the apparatus issued, since the required control settings for any given inspection operation can be furnished to the inspection operator in a set of operating instructions.

The operation of the apparatus for the purpose of routine inspection is very simple, and the training required for an inspection operator is substantially less than even the very moderate amount of training required for a person conducting the calibration operation. The inspection operator need only set the controls to settings in the operating instructions, pass the test pieces through the test coil, and mark the portions of the test piece which are within the test coil when the warning signal operates. The marking of the defect locations can also be performed automatically by providing an ink or paint applicator which is actuated by the Error Signal.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. Apparatus for detecting an inhomogeneity of a preselected type in a metallic component in a non-ferromagnetic condition comprising a source for transmitting a sinusoidally alternating current datum signal; a test coil energized by said datum signal and adapted to be electromagnetically coupled to said metallic component for converting said datum signal to a sinusoidal test coil signal dependent in magnitude and phase upon the impedance-effect of the electromagnetically coupled metallic component; means for deriving from the test coil signal a sharply peaked pulsed first input signal synchronous with the test coil signal and essentially independent of the magnitude thereof; means for receiving the sinusoidal datum signal and generating a pulsed datum signal synchronous with the sinusoidal datum signal; time-delay signal generator means for generating a pulsed phase signal controllably delayed in time with relation to said pulsed datum signal; controllable-duration signal means for generating synchronously with the time-delayed phase signal a pulsed second input signal of controlled duration; and coincidence signal means for receiving from said controllable-duration signal means the controlled duration second input signal, for receiving the sharply peaked first input signal and for transmitting a coincidence signal when the first input signal is received coincidently with at least a portion of the controllable duration second input signal as an indication of the presence of an inhomogeneity of the preselected type.

2. Apparatus for detecting an inhomogeneity of a preselected type in a metallic component in a non-ferromagnetic condition comprising a source for transmitting a sinusoidally alternating current datum signal; a test coil energized by said datum signal and adapted to be electromagnetically coupled to said metallic component for converting said datum signal to a sinusoidal test coil signal dependent in magnitude and phase upon the impendance-effect of the electromagnetically coupled metallic component; means for deriving from the test coil signal a sharply peaked pulsed first input signal synchronous with the test coil signal and essentially independent of the magnitude thereof; means for receiving the sinusoidal datum signal and generating a pulsed datum signal synchronous with the sinusoidal datum signal; time-delay signal generator means for generating a pulsed phase signal controllably delayed in time with relation to said pulsed datum signal; controllable-duration signal means for generating synchronously with the time-delayed phase signal a pulsed second input signal of controlled duration; coincidence signal means for receiving from said controllable-duration signal means the controlled duration second input signal, for receiving the sharply peaked first input signal and for transmitting a coincidence signal when the first input signal is received coincidently with at least a portion of the controllable-duration second input signal; and gating means for receiving the coincidence signal and the sinusoidal test coil signal and for transmitting only when said coincidence signal is received a sinusoidal output signal of magnitude proportional to the test coil signal.

3. Apparatus for detecting an inhomogeneity of a preselected type in a metallic component in a non-ferromagnetic condition comprising a current source for transmitting a sinusoidally alternating current datum signal; a test coil energized by said datum signal and adapted to be electromagnetically coupled to said metallic component for converting said datum signal to a sinusoidal test coil signal dependent in magnitude and timing upon the impedance-effect of the electromagnetically coupled metallic component; means for deriving from the test coil signal a sharply peaked pulsed first input signal synchonous with the test coil signal and essentially independent of the magnitude thereof; means for receiving the sinusoidal datum signal and generating a pulsed datum signal synchronous with the sinusoidal datum signal; time-delay signal generating means for generating a phase signal controllably delayed in time with relation to said pulsed datum signal; controllable-duration signal means for initiating synchronously with the phase signal a pulsed second input signal of controlled duration; coincidence and gating means for receiving the first and second input signals and test coil signal and for transmitting an output signal proportional to the test coil signal when the first and second input signals are received coincidently; and warning means for indicating when an output signal at least equal to a threshold magnitude is transmitted.

4. Apparatus for detecting an inhomogeneity of a preselected type in a metallic component in a nonferromagnetic condition comprising an oscillator for transmitting a sinusoidally alternating current datum signal; a test coil energized by said datum signal and adapted to be electromagnetically coupled to said metallic component for converting said datum signal to a sinusoidal test coil signal dependent in magnitude and timing upon the impedance-effect of the electromagnetically coupled metallic component; means for initiating a square pulse signal synchronous with the test coil signal and essentially independent of the magnitude thereof; means for generating a sharply peaked first input signal with peaks synchronous with initiation of the square pulse signal; a signal squaring circuit for receiving the datum signal and for transmitting a pulsed datum signal synchronous with said sinusoidal datum signal; means for differentiating the pulsed datum signal; a phantastron circuit responsive to the differentiated pulsed datum signal for transmitting a phase signal controllably delayed in time with respect to the datum signal; means for differentiating the phase signal; a controllable-duration signal squaring circuit for initiating a second input signal synchronous with the phase signal and for controlling the duration of the second input signal; coincidence and gating means for receiving the first and second input signals and test coil signal and for transmitting an output signal proportional in magnitude to the test coil signal when the first and second input signals are received coincidently; and warning means for indicating when an output signal at least equal to a threshold magnitude is transmitted.

5. Apparatus for detecting an inhomogeneity of a preselected type in a metallic component in the non-ferromagnetic condition which comprises a source for providing an alternating current datum signal; bridge circuit means having a test coil adapted to be coupled to the metallic component for receiving and converting the datum signal to a sinusoidal test coil signal dependent in magnitude and phase upon the impedance-effect of the metallic component, said bridge circuit means being capable of nullifying the test coil signal when the portion of the metallic component under investigation is uniform but capable of transmitting a sinusoidal error signal proportional to the test coil signal when a portion of the metallic component contains an inhomogeneity within the sensing distance of the test coil; bridge balancing means connected to the bridge for balancing the bridge to nullify test coil signals characteristic of inhomogeneities in the metallic component which are of a gradual changing nature while permitting the transmission of an error signal caused by an inhomogeneity of a discrete nature; means for deriving from the error signal a sharply peaked pulsed first input signal synchronous with the error signal and essentially independent of the magnitude thereof; means for deriving from the datum signal a pulsed second input signal of controlled timing with respect to the datum signal and of controlled duration; and coincidence means for receiving the first and second input signals and for transmitting an output signal when the first and second input signals are received coincidently.

6. The apparatus set forth in claim 5 wherein the bridge circuit comprises a pair of oppositely located input junctions and an output junction; a resistance leg between each input junction and the output junction; a controllable resistance leg having a temperature-dependent resistor; a controllable inductance leg including the test coil, a condenser, and an electrically controllable inductor; and wherein the bridge balancing means includes a temperature control circuit for controlling the temperature of the temperature-dependent resistor and an inductance control circuit for controlling the inductance of the electrically controllable inductor.

7. Apparatus for detecting an inhomogeneity of a preselected type in a metallic omponent in the non-ferromagnetic condition which comprises a source for providing an alternating current datum signal; bridge circuit means having a test coil adapted to be coupled to the metallic component for receiving and converting the datum signal to a sinusoidal test coil signal dependent in magnitude and phase upon the impedance-effect of the metallic component, said bridge circuit means being capable of nullifying the test coil signal when the portion of the metallic component under investigation is uniform but capable of transmitting a sinusoidal error signal proportional to the test coil signal when a portion of the metallic component contains an inhomogeneity within the sensing distance of the test coil; bridge balancing means connected to the bridge for balancing the bridge to nullify test coil signals characteristic of inhomogeneities in the metallic component which are of a gradual changing nature while permitting the transmission of an error signal caused by an inhomogeneity of a discrete nature; means for deriving from the error signal a sharply peaked pulsed first input signal synchronous with the error signal and essentially independent of the magnitude thereof; means for deriving from the datum signal a pulsed second input signal of controlled timing with respect to the datum signal and of controlled duration; and coincidence and gating means for receiving the first and second input signals and error signal and for transmitting an output signal proportional to the error signal when the first and second input signals are received coincidently.

8. Apparatus for detecting an inhomogeneity of a preselected type in a metallic component in the non-ferromagnetic condition which comprises a source for providing an alternating current datum signal; bridge circuit means having a test coil adapted to be coupled to the metallic component for receiving and converting the datum signal to a sinusoidal test coil signal dependent in magnitude and phase upon the impedance-effect of the metallic component, said bridge circuit means being capable of nullifying the test coil signal when the portion of the metallic component under investigation is uniform but capable of transmitting a sinusoidal error signal proportional to the test coil signal when a portion of the metallic component contains an inhomogeneity within the sensing distance of the test coil; bridge balancing means connected to the bridge for balancing the bridge to nullify test coil signals characteristic of inhomogeneities in the metallic component which are of a gradual changing nature while permitting the transmission of an error signal caused by an inhomogeneity of a discrete nature; means for deriving from the error signal a sharply peaked pulsed first input signal synchronous with the error signal and essentially independent of the magnitude thereof; means for receiving the sinusoidal datum signal and generating a pulsed datum signal synchronous with the sinusoidal datum signal; time-delay signal generating means for generating a phase signal controllably delayed in time with relation to said pulsed datum signal; controllable-duration signal means for initiating synchronously with the phase signal a pulsed second input signal of controlled duration; coincidence and gating means for receiving the first and second input signals and error signal and for transmitting an output signal proportional to the error signal when the first and second input signals are received coincidently; and warning means for indicating when an output signal at least equal to a threshold magnitude is transmitted.

9. Apparatus for detecting an inhomogeneity of a selected type in a metallic component in a non-ferromagnetic condition comprising an alternating current source for transmitting a sinusoidal datum signal connected to the inputs of a first input channel and a second input channel; said first input channel comprising a test coil, a signal squaring circuit and a differentiating circuit and being adapted to be electromagnetically coupled by the test coil to successive portions of the metallic component and to generate a sinusoidal test coil signal dependent in magnitude and timing on a variation of impedance caused by an inhomogeneity in the electromagnetically coupled portion of the component and to also generate a sharply peaked pulsed first input signal dependent in timing upon the test coil signal and essentially independent of the magnitude thereof; said second input channel comprising a datum signal squaring circuit, a time-delay signal generating circuit, and a controllable-duration signal squaring circuit, the datum signal squaring circuit being adapted to be triggered by the sinusoidal datum signal and to generate a datum pulse synchronous with the sinusoidal datum signal, the time-delay circuit being adapted to receive a pulsed signal synchronous with the datum pulse and to generate a pulsed phase signal having a time-delay controllable in relation to the datum pulse and the controllable-duration signal squaring circuit being adapted to receive signal synchronous with the phase signal and to generate a pulsed second input signal which is synchronous with the time-delayed phase signal and of controlled duration, said controllable time-delay circuit and said controllable-duration squaring circuit being capable of controlling the timing and duration of the second input signal to thereby define the time interval during which the first input signal is generated by test coil signals within a band of phase angles which characterize an inhomogeneity of a preselected type under investigation when such an inhomogeneity is present within said electromagnetically coupled portion of the component; and a coincidence circuit responsive to the first input signal and to the controllable-duration second input signal and adapted to transmit a coincidence signal only when the first input signal is received coincidently with at least a portion of the controllable-duration second input signal.

10. Apparatus for detecting an inhomogeneity of a selected type in a metallic component in a non-ferromagnetic condition comprising an alternating current source for transmitting a sinusoidal datum signal connected to the inputs of a first input channel and a second input channel; said first input channel comprising a test coil, a signal squaring circuit and a differentiating circuit and being adapted to be electromagnetically coupled by the test coil to successive portions of the metallic component and to generate a sinusoidal test coil signal dependent in magnitude and timing on a variation of impedance caused by an inhomogeneity in the electromagnetically coupled portion of the component and to also generate a sharply peaked pulsed first input signal dependent in timing upon the test coil signal and essentially independent of the magnitude thereof; said second input channel comprising a datum signal squaring circuit, a time-delay signal generating circuit, and a controllable-duration signal squaring circuit, the datum signal squaring circuit being adapted to be triggered by the datum signal and to generate a datum pulse synchronous with the datum signal, the time-delay circuit being adapted to receive a pulsed signal synchronous with the datum pulse and to generate a pulsed phase signal with a time-delay controllable in relation to the datum pulse, and the controllable-duration signal squaring circuit being adapted to receive signals synchronous with the phase signal and to generate a pulsed second input signal which is synchronous with the time-delayed phase signal and of controlled duration, said controllable time-delay circuit and said controllable duration squaring circuit being capable of controlling the timing and duration of the second input signal to thereby define the time interval during which the first input signal is generated by test coil signals within a band of phase angles which characterize an inhomogeneity of a preselected type under investigation when such an inhomogeneity is present within said electromagnetically coupled portion of the component; and a discriminative channel comprising a coincidence circuit and a gating circuit, said coincidence circuit being responsive to the first input signal and to the controllable-duration second input signal and adapted to transmit a coincidence signal only when the first input signal is received coincidently with at least a portion of the controllable-duration second input signal; and said gating circuit being responsive to the coincidence signal and the sinusoidal test coil signal, being biased in a nontransmitting state when not receiving the coincidence signal and being adapted to transmit a sinusoidal output signal proportional to the test coil signal when receiving the coincidence signal.

11. Apparatus for detecting an inhomogeneity of a selected type in a metallic component in a non-ferromagnetic condition comprising an alternating current source connected to the inputs of a first input channel and a second input channel; said first input channel comprising a signal squaring circuit, a differentiating circuit, a bridge balancing circuit and a bridge circuit having controllable impedance elements responsive to the bridge balancing circuit and having a test coil adapted to be electromagnetically coupled to successive portions of the metallic component to generate a sinusoidal test coil signal dependent in magnitude and timing upon the impedance-effect of the metallic component, the bridge balancing circuit and the controllable impedance elements being adapted to automatically balance the bridge to nullify test coil signals characteristic of inhomogeneities which are of a gradual changing nature while simultaneously maintaining the bridge in a condition for transmitting a sinusoidal error signal characteristic of a discrete inhomogeneity, the signal squaring circuit and differentiating circuit being adapted to generate a sharply peaked pulsed first input signal dependent upon the timing of the error signal and essentially independent of the magnitude thereof, said second input channel comprising a signal squaring circuit, a time-delay signal generating circuit, and a controllable-duration signal squaring circuit and being adapted to generate a pulsed second input signal the timing of which defines the time interval during which the first input signal is generated when an inhomogeneity of a selected type under investigation is present within said electromagnetically coupled portion of the component; and a discriminative channel adapted to receive signals from the first and second input channels and to provide an indication when the time of reception of the first input signal substantially coincides with reception of at least a portion of the second input signal.

12. Apparatus for detecting an inhomogeneity of a selected type in a metallic component in a non-ferromagnetic condition comprising an alternating current source for transmitting a sinusoidal datum signal connected to the inputs of a first input channel and a second input channel; said first input channel comprising a signal squaring circuit, a differentiating circuit, a bridge balancing circuit and a bridge circuit having controllable impedance elements responsive to the bridge balancing circuit and having a test coil adapted to be electromagnetically coupled to successive portions of the metallic component to generate a sinusoidal test coil signal dependent in magnitude and timing upon the impedance-effect of the metallic component, the bridge balancing circuit and the controllable impedance elements being adapted to automatically balance the bridge to nullify test coil signals characteristic of inhomogeneities which are of a gradual changing nature while simultaneously maintaining the bridge in a condition for transmitting a sinusoidal error signal characteristic of a discrete inhomogeneity, the signal squaring circuit and differentiating circuit being adapted to generate a sharply peaked pulsed first input signal dependent upon the timing of the error signal and esentially independent of the magnitude thereof; said second input channel comprising a datum signal squaring circuit, a time-delay signal generating circuit, and a controllable-duration signal squaring circuit, the datum signal squaring circuit being adapted to be triggered by the datum signal and to generate a datum pulse synchronous with the datum signal, the time-delay circuit being adapted to receive a pulsed signal synchronous with the datum pulse and to generate a pulsed phase signal with a time-delay controllable in relation to the datum pulse, and the controllable-duration signal squaring circuit being adapted to receive signals synchronous with the phase signal and to generate a pulsed second input signal of controlled duration which is synchronous with the phase signal and the timing of which defines the time interval during which the first input signal is generated when an inhomogeneity of a selected type under investigation is present within said electromagnetically coupled portion of the component; and a discriminative channel comprising a coincidence circuit and a gating circuit, said discriminative channel being adapted to receive signals from the first and second input channels and to provide an indication in the form of a signal proportional to the error signal when the time of reception of the first input signal substantially coincides with reception of at least a portion of the second input signal.

References Cited by the Examiner
UNITED STATES PATENTS

| | | | |
|---|---|---|---|
| 2,467,124 | 4/1949 | Germann | 324—34 |
| 2,489,920 | 11/1949 | Michel | 324—40 |
| 2,644,133 | 6/1953 | Soukaras | 324—83 |
| 2,940,042 | 6/1960 | Fisher | 328—110 X |
| 2,985,824 | 5/1961 | Renkin | 324—83 |

WALTER L. CARLSON, *Primary Examiner.*

FREDERICK M. STRADER, RICHARD B. WILKINSON, *Examiners.*

R. B. LAPIN, R. J. CORCORAN, *Assistant Examiners.*

UNITED STATES PATENT OFFICE
CERTIFICATE OF CORRECTION

Patent No. 3,278,839                                  October 11, 1966

William Henry Wells et al.

It is hereby certified that error appears in the above numbered patent requiring correction and that the said Letters Patent should read as corrected below.

In the heading to the six sheets of drawing title of invention, for "APPARATUS FOR DETECTING A PARTICULAR EDDY CURRENT TYPE FLAW UTILIZING PULSE COINCIDENCE DETECTION", each occurrense, read -- EDDY CURRENT APPARATUS FOR DETECTING A PARTICULAR TYPE FLAW UTILIZING PULSE COINCIDENCE DETECTION --; column 4, line 59, for "ocntrollable" read -- controllable --; column 11, line 37, for "Potentiometer 73" read -- Potentiometer 72 --; column 13, line 61, for "issued" read -- is used --; column 16, line 20, for "omponent" read -- component --; column 19, line 14, for "esentially" read -- essentially --.

Signed and sealed this 5th day of September 1967.

(SEAL)
Attest:

ERNEST W. SWIDER                               EDWARD J. BRENNER
Attesting Officer                             Commissioner of Patents